United States Patent
Rim

(10) Patent No.: US 6,772,792 B2
(45) Date of Patent: Aug. 10, 2004

(54) COMPRESSOR VALVE ASSEMBLY

(75) Inventor: Ho-sang Rim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 214 days.

(21) Appl. No.: 10/090,140

(22) Filed: Mar. 4, 2002

(65) Prior Publication Data

US 2003/0005970 A1 Jan. 9, 2003

(30) Foreign Application Priority Data

Jun. 29, 2001 (KR) ............................... 10-2001-0038185

(51) Int. Cl.$^7$ ............................................. F16K 15/14
(52) U.S. Cl. ...................................................... 137/856
(58) Field of Search ........................................ 137/856

(56) References Cited

U.S. PATENT DOCUMENTS 4,628,963 A * 12/1986 Ishijima et al. ............. 137/857
5,379,799 A * 1/1995 Kawai et al. ................ 137/856

* cited by examiner

Primary Examiner—Kevin Lee
(74) Attorney, Agent, or Firm—Westman, Champlin & Kelly, P.A.

(57) ABSTRACT

The valve assembly includes a valve plate having a refrigerant discharging hole, a discharging valve having one end that is settled at the valve plate for opening and closing the refrigerant discharging hole, a keeper, placed at above the discharging valve, having one end that is connected with the valve plate with the discharging valve for limiting lift of the discharging valve, and a bead protruded for a predetermined width W and height H at a lower side of the keeper. The lift L of the discharging valve can be maintained evenly, since the bead compresses an upper side of the discharging valve. Moreover, the discharging valve is firmly settled at the valve plate. Accordingly, abnormal noise generated when refrigerant is discharged can be reduced because the discharging valve operates with stability.

7 Claims, 5 Drawing Sheets

COMPRESSOR VALVE ASSEMBLY

The present application is based on and claims the benefit of Korean patent application Serial Nos. 2001-38185, filed Jun. 29, 2001, the contents of which are hereby incorporated by reference in their entirety.

BACKGROUND OF THE INVENTION

1. Field of the Invention

The present invention relates to a compressor valve assembly, and more particularly to a valve assembly capable of reducing abnormal noise when refrigerant is discharged.

2. Description of the Related Art

Generally, a compressor is widely used for compressing refrigerant in a freezing apparatus such as a refrigerator.

As shown in FIG. 1, a conventional reciprocal compressor comprises a driving unit 20 including a stator 21 and a rotator 22 in a body case 10, and a compressing unit 30 for discharging refrigerant after drawing the refrigerant in accordance with rotation of a crank shaft 23 inserted by compressing at center of the rotator 22.

The compressing unit 30 includes a cylinder 31, and a piston 32 for compressing refrigerant by reciprocating inside of the cylinder 31. A cylinder head 33 for sealing the cylinder 31 is disposed at a front of the cylinder 31. On the other hand, a valve assembly 40, for supplying the refrigerant in the cylinder 31 or discharging the refrigerant from the cylinder 31, is inserted between the cylinder head 33 and the cylinder 31.

As shown in FIG. 2, the valve assembly 40 comprises a valve plate 42 in which a refrigerant discharging hole 41 is formed, a discharging valve 43, formed between the valve plate 42 and the cylinder head 33, for opening and closing the refrigerant discharging hole 41, and a keeper 44, formed at an upper part of the discharging valve 43, for controlling opening range.

The discharging valve 43 comprises a settled end 43a, which is settled at the valve plate 42, and a free end 43b for vibrating up and down by a compressing force of the piston 32, and the free end 43b is formed at an upper part of the refrigerant discharging hole 41.

The keeper 44 includes a settled end 44a connected with the settled end 43a of the discharging valve 43, and an open end 44b formed at a corresponding place of the free end 43b of the discharging valve 43. The keeper 44 to be formed that an opened end 44b is bent upwardly from a settled end 44a for the discharging valve 43 to have a lift L of a predetermined height.

According to a conventional valve assembly 40 with the above construction, the keeper 44 should be exactly bent for the discharging valve 43 to have appropriate lift L. However, it is very difficult to bend exactly as it is wanted because of a feature of the bending processing. If the keeper 44 is processed that the lift L is greater than an appropriate volume, noise is generated since the discharging valve 43 is opened too much and the discharging valve 43 collides with the keeper 44 when the refrigerant is discharged.

In addition, according to the conventional valve assembly 40, if a lower side of the settled end 44a of the keeper 44 is not flat, the discharging valve 43 and the keeper 44 can not be adhered to each other at a connecting place. If the discharging valve 43 and the keeper 44 are not adhered at the connecting place, the lift L of the discharging valve 43 cannot be maintained evenly, and thus the discharging valve 43 cannot operate with stability. Therefore, if the discharging valve 43 is collided with the keeper 44, or the free end 43b of the discharging valve 43 is vibrated due to remained vibration, when the refrigerant is discharged, abnormal noise is generated.

SUMMARY OF THE INVENTION

The present invention has been made to overcome the above-mentioned problems of the related art. Accordingly, it is an object of the present invention to provide a compressor valve assembly capable of reducing abnormal noise generated while refrigerant is being discharged because lift of a discharging valve is maintained evenly and the discharging valve is firmly settled at the valve plate.

The above object of the present invention is accomplished by providing a valve assembly including a valve plate having a refrigerant discharging hole, a discharging valve having one end that is settled at the valve plate for opening and closing the refrigerant discharging hole, a keeper, placed at an upper part of the discharging valve, having one end that is connected with the valve plate with the discharging valve for limiting lift of the discharging valve, and a bead protruded for a predetermined width and height at a lower side of the keeper.

Here, the bead is spaced for a predetermined length from a center of a connection member connecting the each settled end of the discharging valve and the keeper with the valve plate in direction of the refrigerant discharging hole.

When the height of the bead is 0.1 to 0.5 mm, the lift of the discharging valve is 0.36 to 0.66 mm, and preferably, when the height of the bead is 0.23 mm, the lift of the discharging valve is 0.56 mm. Moreover, the width of the bead is 0.5 to 2.0 mm, and preferably, the width of the bead is 1.5 mm.

According to the present invention, since the bead presses an upper side of the discharging valve, the lift of the discharging valve is maintained evenly, and the settled end of the discharging valve is firmly settled at the valve plate. Therefore, abnormal noise generated while refrigerant is being discharged can be reduced due to stable operation of the discharging valve.

BRIEF DESCRIPTION OF THE DRAWINGS

The described objects and features of the present invention will be more apparent by explaining the preferred embodiment of the present invention by referring to the appended drawings, in which.

DETAILED DESCRIPTION OF THE PREFERRED EMBODIMENT

From now on, the preferred embodiment of the present invention will be described by referring to the accompanying drawings. However, same referential numerals will be given to the same part with the conventional compressor, and the description will be omitted.

Figure 1:
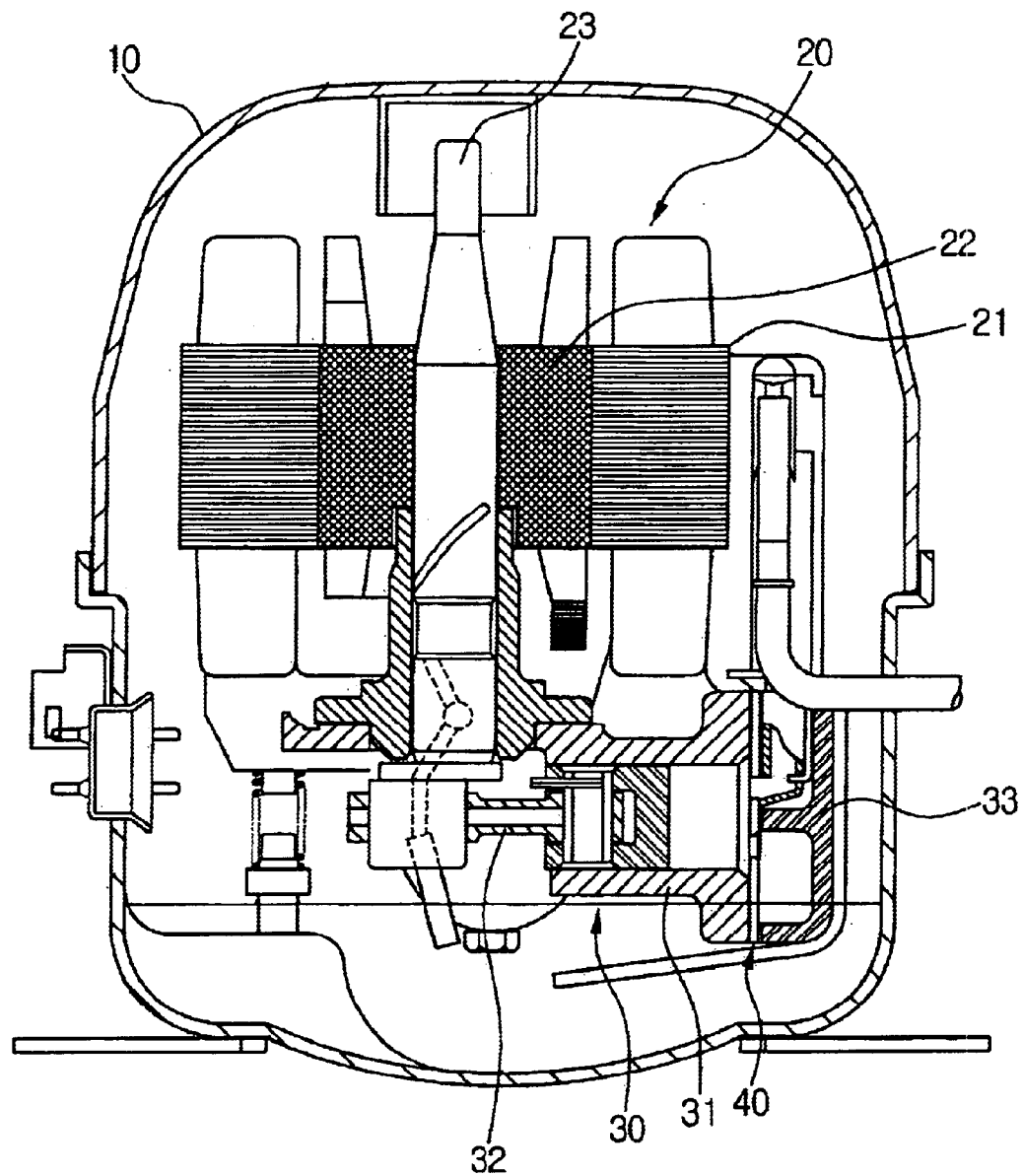
FIG. 1 is a sectional view showing a conventional reciprocal compressor.
Figure 3:
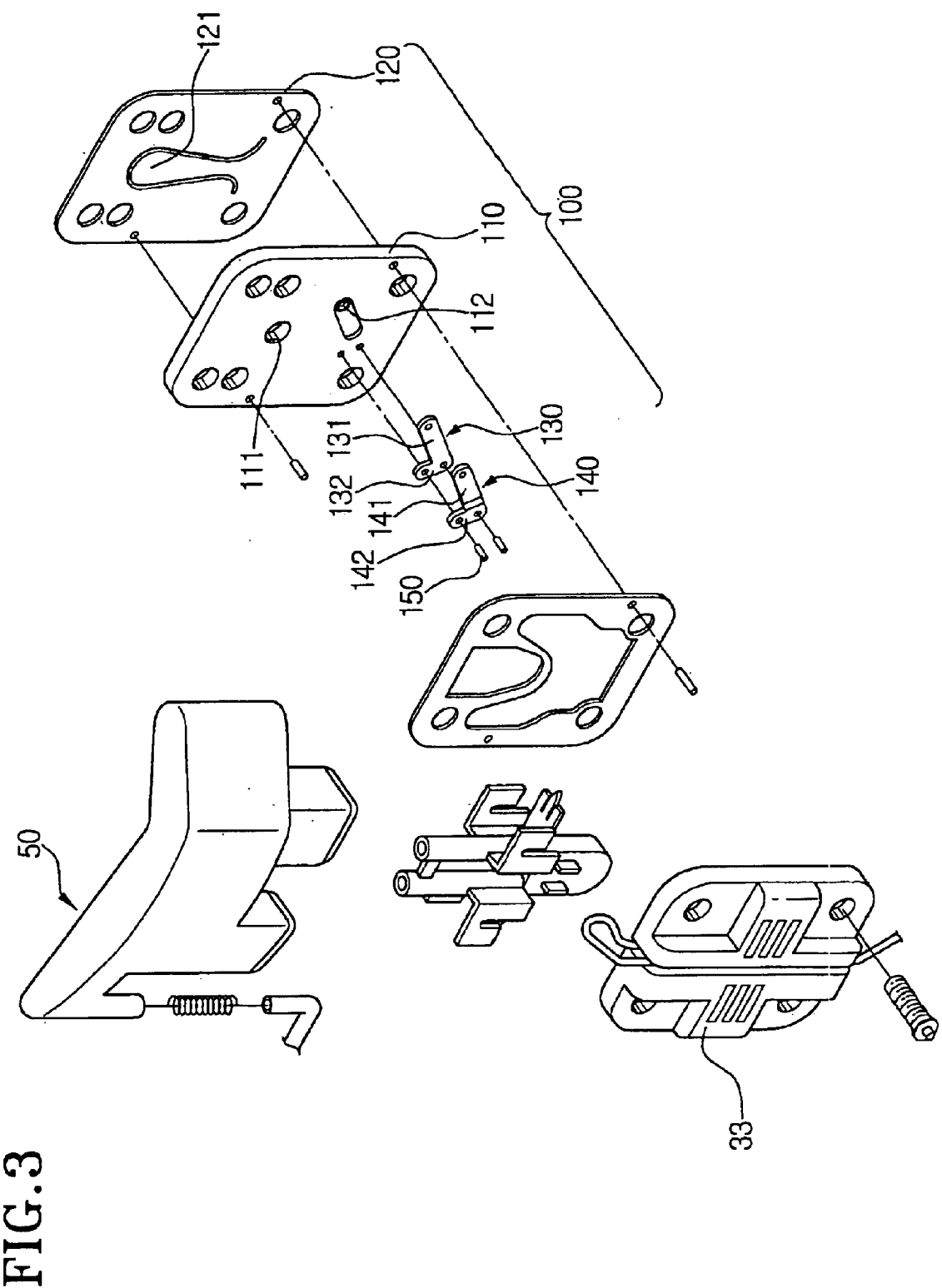
FIG. 3 is an exploded perspective view showing a valve assembly according to the present invention.

As shown in FIG. 3, a valve assembly 100 according to the present invention includes a valve plate 110 having a refrigerant suction hole 11 and a refrigerant discharging hole 112, a suction valve plate 120, having a suction valve 121, disposed between the valve plate 110 and a cylinder (refer to FIG. 1:31) for opening and closing the refrigerant suction hole 111, a discharging valve 130, for opening and closing the refrigerant discharging hole 112, disposed between the valve plate 110 and a cylinder head 33, and a keeper 140, for controlling opening range, disposed at an upper part of the discharging valve 130.

The discharging valve 130 comprises a free end 131, vibrated as a piston compresses the refrigerant, disposed at an upper part of the refrigerant discharging hole 112, and a settled end 132 settled at the valve plate 110.

The keeper 140 comprises an open end 141 disposed at a corresponding place of the free end 131 of the discharging valve 130, and a settled end 142 settled at the valve plate 110 with the settled end 132 of the discharging valve 131. The settled end 132 of the discharging valve 131 and the settled end 142 of the keeper 140 are connected with the valve plate 110 by a connection member such as a rivet 150.

On the other hand, the undesignated referential numeral 50 is a suction muffler. The refrigerant drawn from the outside of a compressor is drawn into the cylinder head 33 via the suction muffler 50. After that, if the suction valve 121 is opened, the refrigerant is drawn into inside of the cylinder 31 via the refrigerant suction hole 111.

Figure 4:
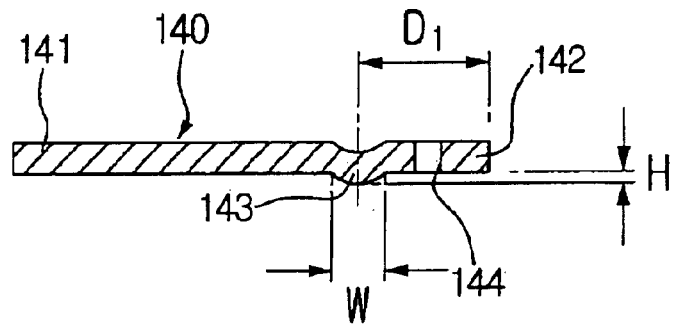
FIG. 4 is a side sectional view showing a keeper in the valve assembly of FIG. 3.

As shown in FIG. 4, the keeper 140 is formed that the open end 141 and the settled end 142 have the same height. A settling hole 144 for connecting the rivet 150 is formed at the settled end 142 of the keeper 140. A bead 143 is protruded for a predetermined width W and height H at a lower side of the keeper 140. The bead 143 is spaced for a predetermined length from the settling hole 144 in direction of the open end 141. In the meantime, the bead 143 can be formed by pressing the upper part of the keeper 140, or by attaching a separate protruding member at the lower part of the keeper 140.

Figure 5:
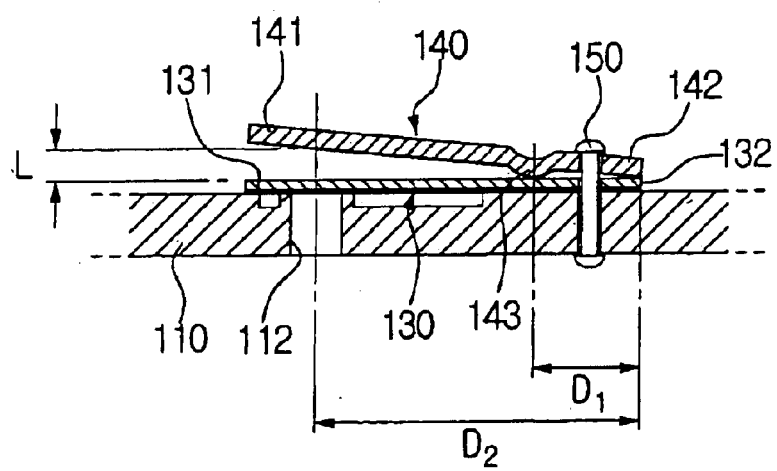
FIG. 5 is a side sectional view showing connection status of the valve assembly of FIG. 3.

As shown in FIG. 5, if the settled end 132 of the discharging valve 130 and the settled end 142 of the keeper 140 are connected with the valve plate 110 by the rivet 150, the settled end 142 of the keeper 140 is pressed in direction of the valve plate 110, and thus, the open end 141 of the keeper 140 is sloped in direction of being distanced from the valve plate 110 centering the bead 143.

Therefore, the lift L of the discharging valve 130 is differentiated by the height H of the bead 143, and a location of the bead 143 on the keeper 140. In other words, the lift L is determined by the following mathematical expression.
[Mathematical Expression]

$$L = D_2 \cdot \frac{H}{D_1}$$

Here, L is the lift of the discharging valve 130, D1 is a distance from end of the settled end 142 of the keeper 140 to center of the bead 143, D2 is a distance from end of the settled end 142 of the keeper 140 to center of the refrigerant discharging hole 112, and H is the height of the bead 143.

If D1 is 7.5 mm and D2 is 18 mm, and the height H of the bead 143 is 0.233 mm, then the lift L is 0.56 mm. As described above, after the distance of D1 and D2 are being decided, as the height H of the bead 143 is changed, the lift L of the discharging valve 130 can be adjusted.

It is preferable that the lift L of the discharging valve 130 is 0.36 mm to 0.66 mm for stable discharging of the refrigerant and reducing discharging noise. To meet the lift L, the bead is formed to have a height H of 0.1 mm to 0.5 mm.

Figure 2:
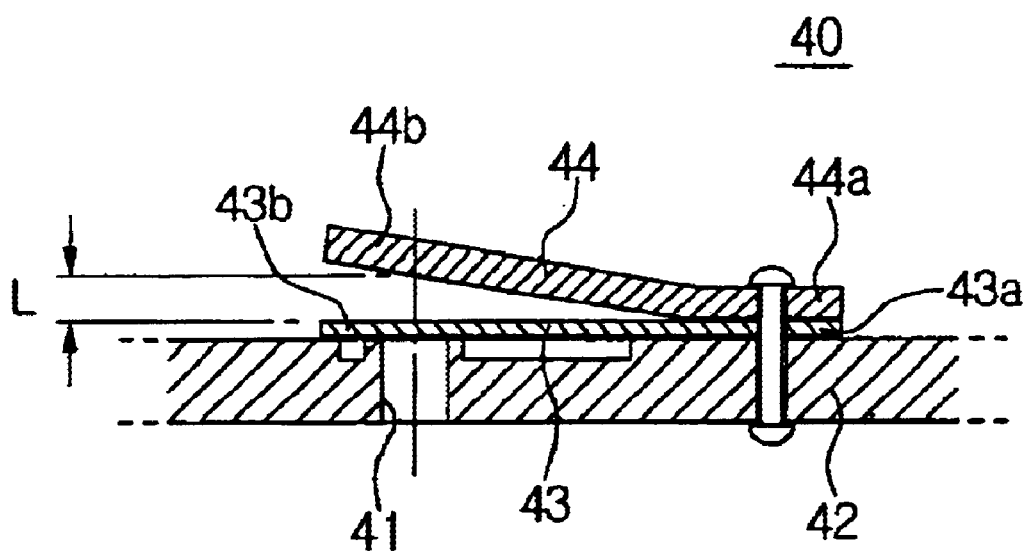
FIG. 2 is a side sectional view showing a conventional valve assembly.
Figure 6:
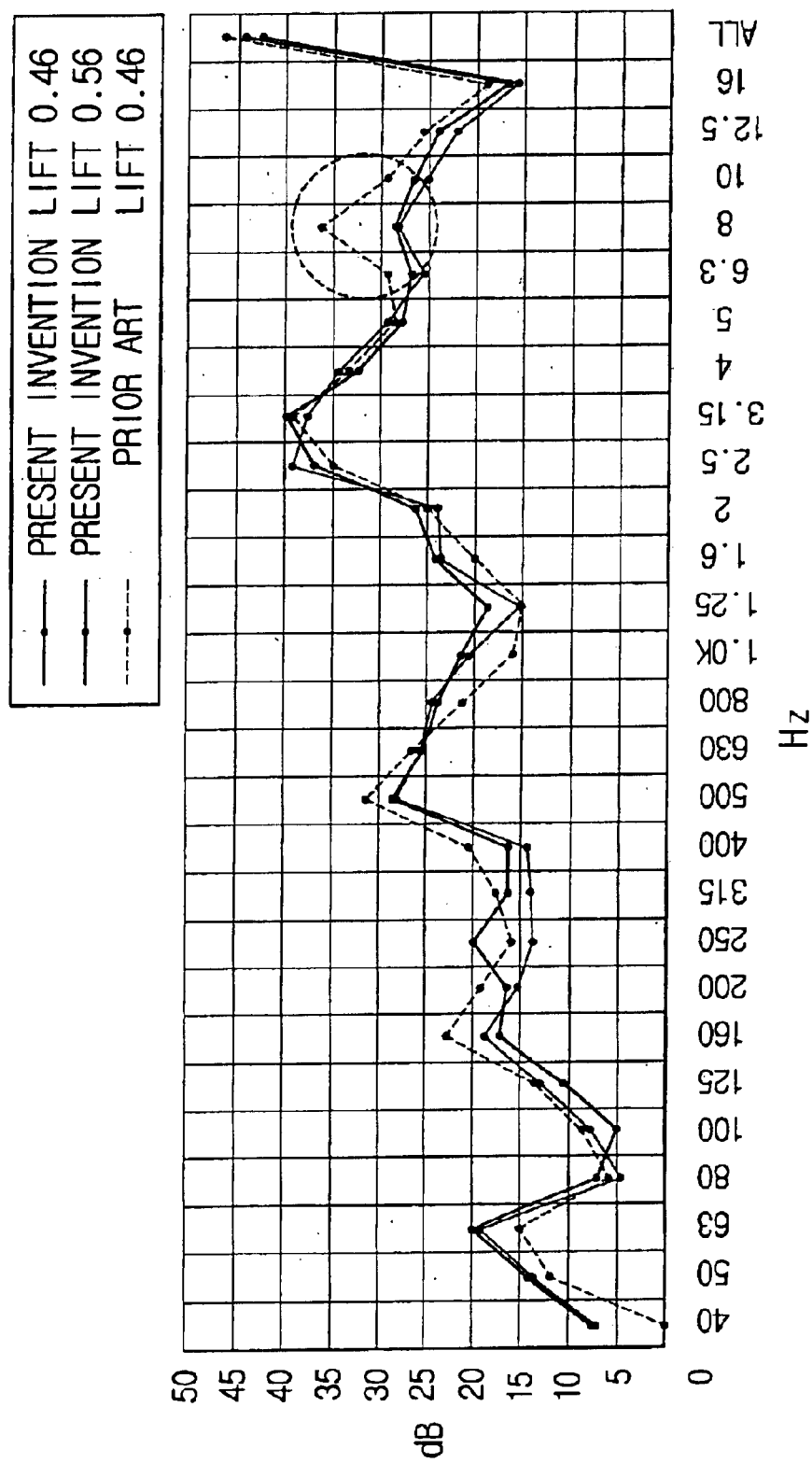
FIG. 6 is a graph showing the result of measuring generated noise at each frequent band of a compressor having the conventional valve assembly and a compressor having the valve assembly of the present invention.

On the other hand, it is advisable that the width W of the bead 143 is 0.5 mm to 2.0 mm given contacting surface with the discharging valve 130. FIG. 6 is a graph showing the result of measuring the noise of each compressor employing conventional valve assembly 40 (refer to FIG. 2) and the valve assembly 100 according to the present invention. In the graph, the conventional valve assembly 40 having the lift L of 0.46 mm is indicated by a dotted line, the valve assembly 100 of the present invention having the lift L of 0.46 mm is indicated by a thin solid line, and the valve assembly 100 of the present invention having the lift L of 0.56 mm is indicated by a thick solid line.

As shown in FIG. 6, when the lift L of the discharging valve 130 is 0.56 mm, it is measured that the effect of reducing the generated noise of the refrigerant is overly considerable. Especially, in 8 kHz frequency band, while the noise generated form the conventional valve assembly 40 is about 33.3 dB, the noise generated form the valve assembly 100 of the present invention is about 28 dB. Therefore, the discharging noise in 8 kHz frequency band is remarkably reduced by the present invention.

In the experiment of FIG. 6, the height H of the bead 43 is 0.233 mm when the D1 is 7.5 mm and the D2 is 18 mm, to meet the lift L of the discharging valve 130 as 0.56 mm. Also, the width W of the bead 143 is 1.5 mm.

As described above, according to the present invention, the lift L of the discharging valve 130 is maintained because the keeper 140 is sloped by the bead 143 formed at the lower part without bending the keeper 140 as the conventional one, thus, it is easy to process the keeper 140 for the discharging valve 130 to have a proper lift L.

Moreover, according to the present invention, the bead 143 presses the upper surface of the discharging valve 130, thus the lift L of the discharging valve 130 is maintained evenly. In addition, the settled end 132 of the discharging valve 130 is firmly settled at the valve plate 110. Therefore, the discharging valve 130 is operated with stability, and thus, the abnormal noise generated while the refrigerant is being discharged can be reduced.

Although the preferred embodiment of the present invention has been described, it will be understood by those skilled in the art that the present invention should not be limited to the described preferred embodiment. Various changes and modifications can be made within the spirit and scope of the present invention as defined by the appended claims.

What is claimed is:

1. A compressor valve assembly, comprising:
   a valve plate having a refrigerant discharging hole;
   a discharging valve having one end that is settled at the valve plate for opening and closing the refrigerant discharging hole;
   a keeper, placed above the discharging valve, having one end that is connected with the valve plate with the discharging valve for limiting lift (opening range) of the discharging valve; and
   a bead protruded for a predetermined width and height at a lower side of the keeper, the bead held in contact with the discharging valve when the valve is in an open and a closed position.

2. The compressor valve assembly of claim 1, wherein the bead is spaced for a predetermined length from a center of a connection member connecting the each settled end of the discharging valve and the keeper with the valve plate in direction of the refrigerant discharging hole.

3. The compressor valve assembly of claim 2, wherein the lift of the discharging valve is determined from a below expression:

$$L = D_2 \cdot \frac{H}{D_1}$$

where L is the lift of the discharging valve, D1 is a distance from end of the settled end of the keeper to center of the bead, D2 is a distance from end of the settled end of the keeper to center of the refrigerant discharging hole, and H is a height of the bead.

4. The compressor valve assembly of claim 2, wherein when the height of the bead is 0.1 to 0.5 mm, the lift of the discharging valve is 0.36 to 0.66 mm.

5. The compressor valve assembly of claim 4, wherein when the height of the bead is 0.23 mm, the lift of the discharging valve is 0.56 mm.

6. The compressor valve assembly of claim 5, wherein the width of the bead is 0.5 to 2.0 mm.

7. The compressor valve assembly of claim 6, wherein the width of the bead is 1.5 mm.

* * * * *